United States Patent [19]
Hall III

[11] Patent Number: 5,390,986
[45] Date of Patent: Feb. 21, 1995

[54] SELF-ENERGIZING VEHICULAR BRAKE SYSTEM WITH ELECTRONICALLY ACTUATED HYDRAULIC BALANCE FORCES

[75] Inventor: Arthur Hall III, Cicero, Ind.

[73] Assignee: General Motors Corporation, Detroit, Mich.

[21] Appl. No.: 28,510

[22] Filed: Mar. 9, 1993

[51] Int. Cl.6 ............................................. B60T 13/74
[52] U.S. Cl. ........................................ 303/3; 303/15; 303/113.4; 188/71.4
[58] Field of Search ............... 303/113.1, 113.4, 116.1, 303/116.2, 3.15; 188/72.2, 71.4, 71.3, 140 A, 140 R, 106 F

[56] References Cited

U.S. PATENT DOCUMENTS

| | | | |
|---|---|---|---|
| 3,003,590 | 10/1961 | Ash | 188/71.4 |
| 3,583,529 | 6/0971 | Robinson | 188/71.4 |
| 3,731,767 | 5/1973 | Lefort | 303/116.3 |
| 4,557,528 | 12/1985 | Leiber | 303/113.4 |
| 4,779,937 | 10/1988 | Burgdorf et al. | 303/113.4 |
| 4,802,562 | 2/1989 | Kuroyanagi et al. | 303/15 |
| 5,012,901 | 5/1991 | Campbell et al. | 188/71.4 |
| 5,201,573 | 4/1993 | Leiber et al. | 303/113.4 |
| 5,248,190 | 9/1993 | Sato et al. | 303/113.4 |

Primary Examiner—Matthew C. Graham
Attorney, Agent, or Firm—Donald F. Scherer

[57] ABSTRACT

A vehicular braking system embodying the present concept utilizes multi-plate brake packs in conjunction with a mechanical actuating system that comprises first ramps secured to ground and second ramps presented from an annular apply cam member as well as a brake apply annulus, the latter being disposed adjacent the brake pack with rollers between the ramps and between the brake pack and the brake apply annulus. The annular apply cam member is connected to the brake pedal by a suitable linkage so that actuation of the pedal transmits brake apply torque to the apply cam member which results in the application of an apply force to the brake pack by virtue of the rollers which effect axial translation of the brake apply annulus in response to rotation of the annular apply cam member. The system also includes an anti-lock brake system which is actuated in response to depression of the brake pedal. The anti-lock brake system actuates a hydraulic piston which acts against the brake apply annulus in an axial direction opposite the mechanical apply force to control the braking force and produce the required deceleration rate until the brake pedal is released.

2 Claims, 11 Drawing Sheets

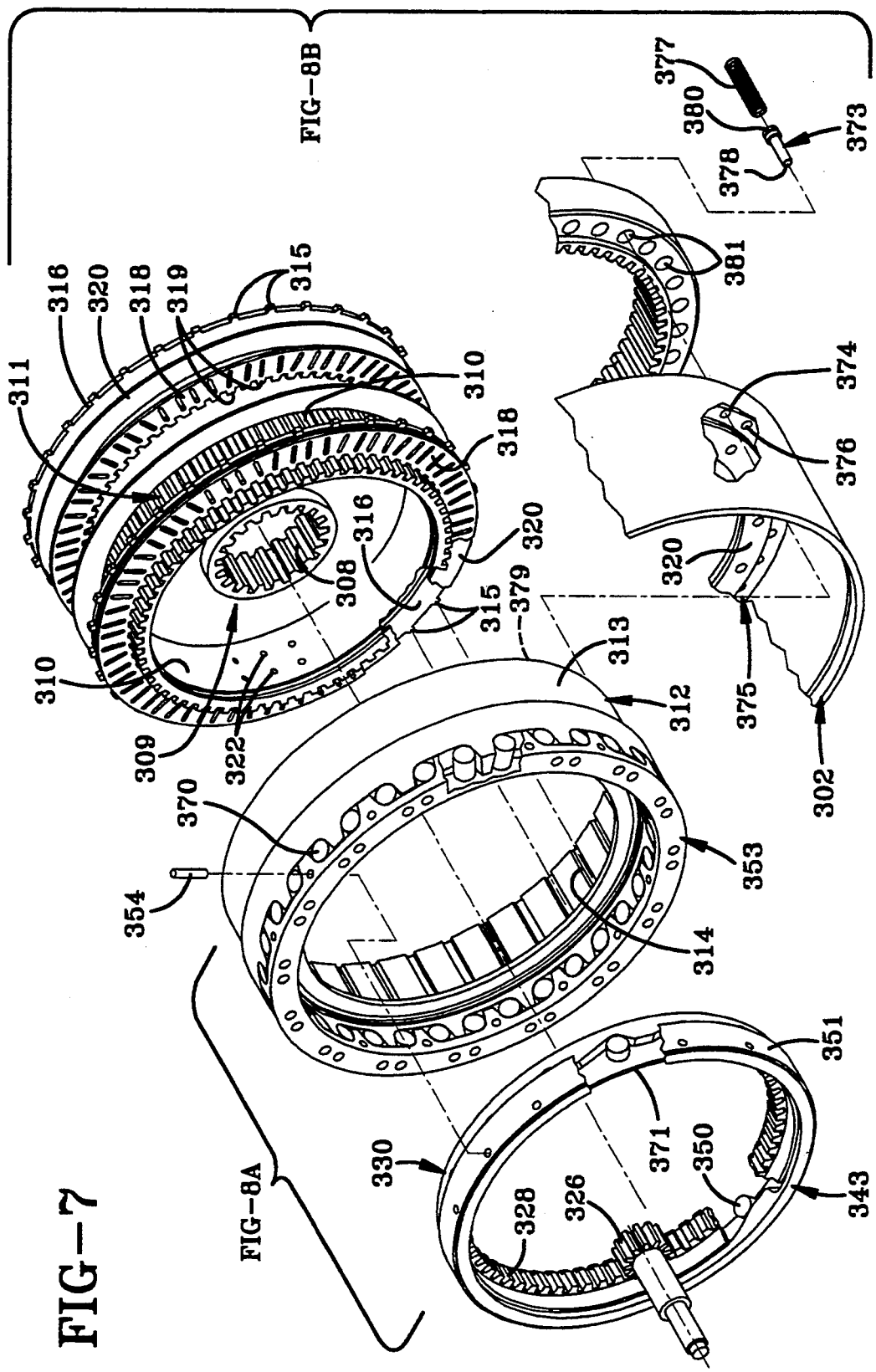

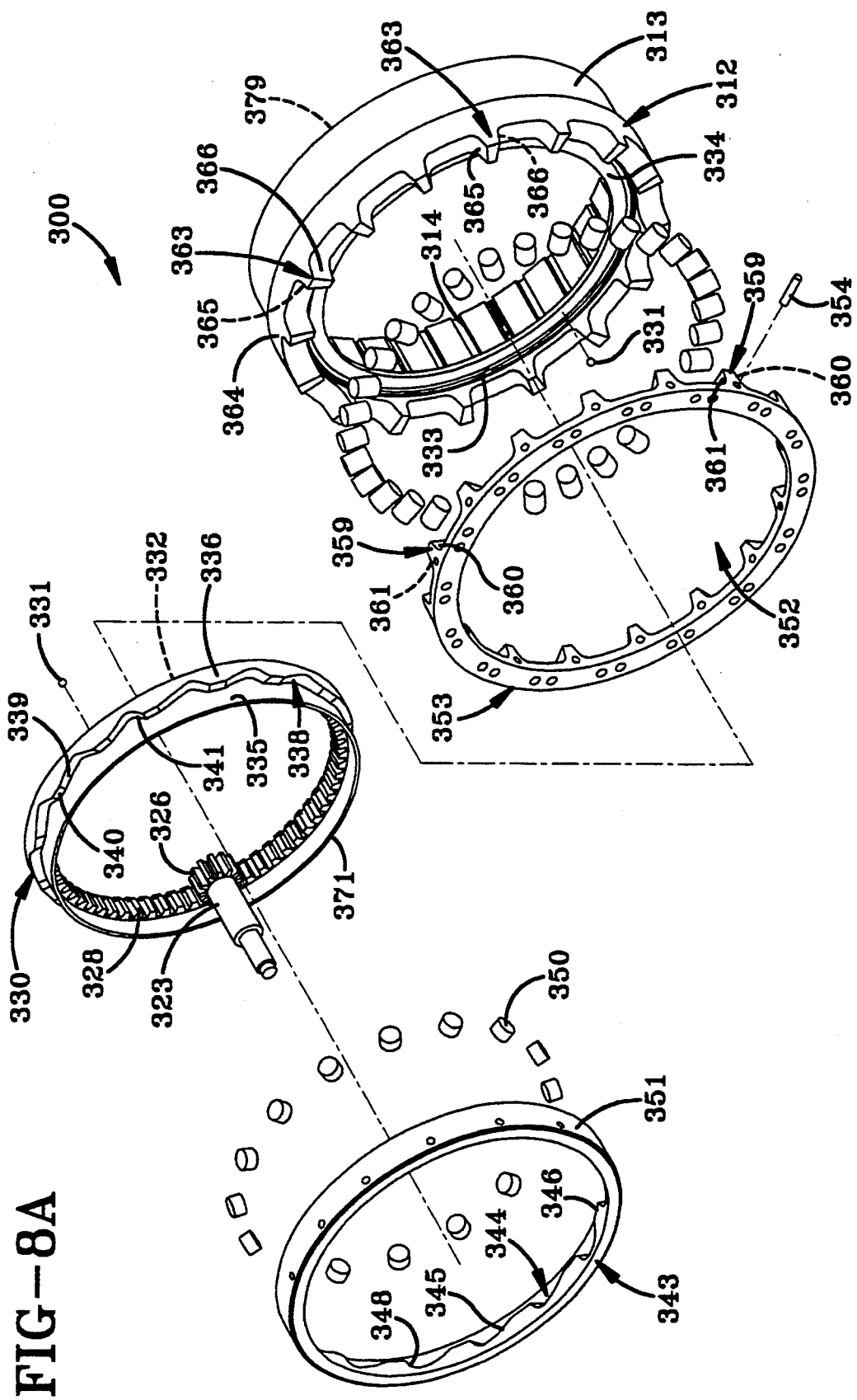

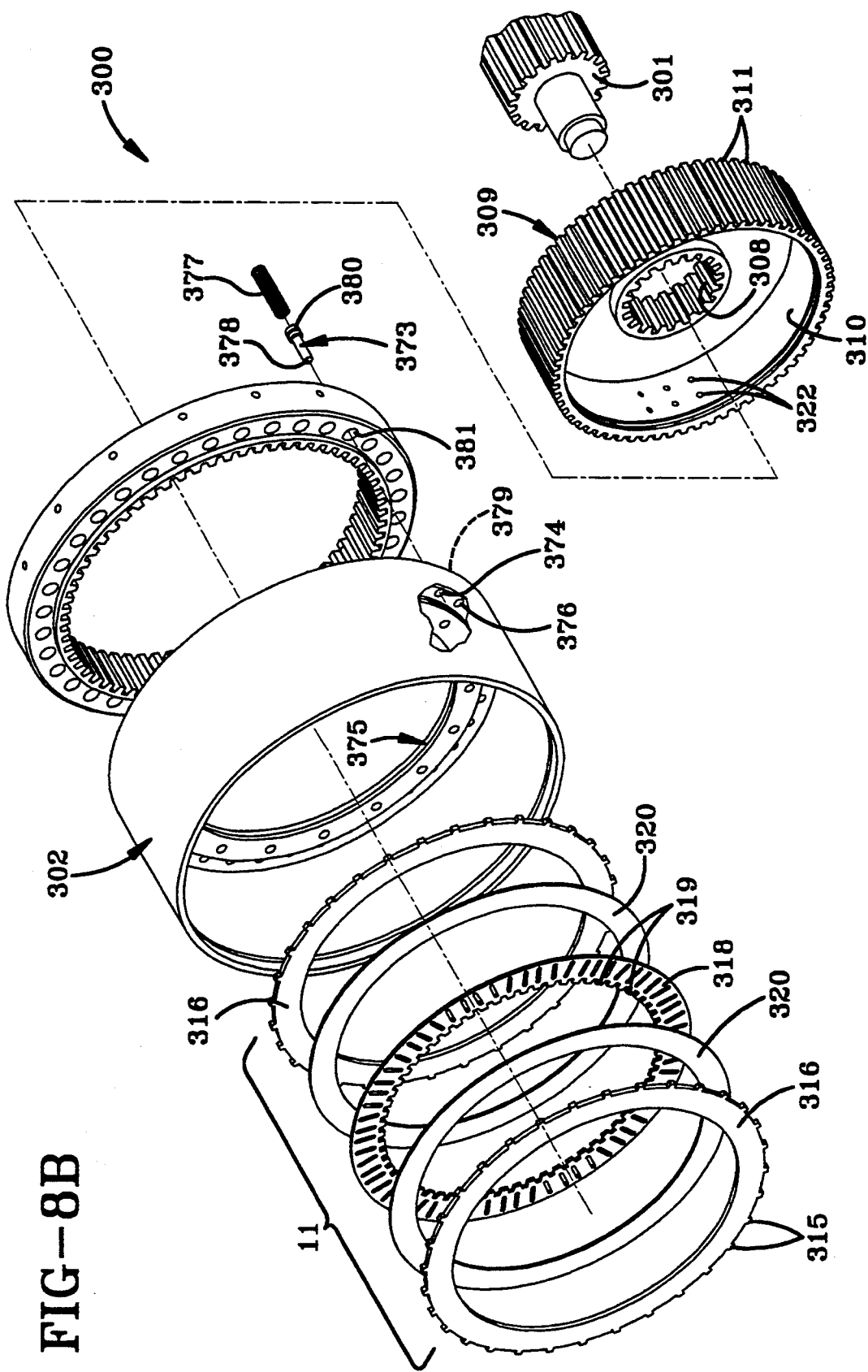

SELF-ENERGIZING VEHICULAR BRAKE SYSTEM WITH ELECTRONICALLY ACTUATED HYDRAULIC BALANCE FORCES

TECHNICAL FIELD

The present invention relates generally to vehicular braking systems. More particularly, the present invention relates to mechanically actuated vehicular braking systems that incorporate self-energization. Specifically, the present invention relates to a mechanically actuated vehicular braking systems that can accommodate self-energization in excess of ninety percent (90%) by virtue of an electronically controlled, hydraulic balancing force that precludes non-linear pedal resistance, excessive brake lag at partial apply and locking of the braking system by uncontrolled self-energization.

BACKGROUND OF THE INVENTION

The use of wet, multi-plate brake systems for vehicle braking has been historically known. Early systems employed a mechanical arrangement of levers, links and/or cams responsive to brake pedal pressure to compress the brake pack and decelerate the output member.

Later braking system developments combined a hydraulic apply system with a mechanical apply system to reduce required pedal effort for a given deceleration rate. The forces generated by the hydraulic and the mechanical apply systems combined to compress the multi-plate brake packs employed with individual transmission output shafts, or the axle assemblies connected thereto. Such brake packs are generally actuated by axial compression to effect the desired braking action in response to depression of the brake pedal. That is, the compression of the multiple, interleaved torque plates, with the associated friction disks therebetween, effects the torque transfer which actually slows the vehicle.

More specifically, a system of cams and levers between the apply shaft and a brake apply member causes the latter member to rotate in proportion to rotation of the apply shaft. Rollers are received between two ramps—one of which is on the brake apply member that is adjacent to, and engages, the brake pack and the other of which is attached to ground. The opposed ramps engage the rollers and are circumferentially inclined such that when the brakes are applied, the brake apply member is forced against the brake pack. This results in a mechanical compression of the brake pack, and the mechanical force at the brake is proportional to the force on the brake pedal.

The mechanical operation results in significant self-energization by virtue of the frictional interaction between the torque plates within the brake pack. Self-energization can, therefore, cause the brake pack to effect a deceleration rate in excess of that desired, or expected. This result is compounded by the hydraulic portion of such a combined system. Combined systems include an arrangement wherein one of the apply shafts also actuates a hydraulic valve which, in turn, delivers brake apply pressure to pistons associated with the brake apply member. The hydraulically generated pressure acting against the brake apply member also forces the brake apply member against the brake pack, thereby adding an additional force to the force generated by the mechanical aspect of the combined braking system. The pressure generated by such a system does not provide a feed back force at the pedal that is in any way proportional to, or reflective of, the hydraulically generated brake apply pressure.

The customary timing of a combined mechanical and hydraulic system is such that the initial rotation of the apply shaft results in mechanically stroking the brake apply member. The hydraulic apply is normally delayed until after the apply shaft has been rotated sufficiently to signal the brake coolant valve, thus assuring that cooling fluid—normally the lubricating oil—is present before the clearance between the torque plates, and the associated friction disks, in the brake packs is completely removed. During this first few degrees of relative rotation between the friction disks in the brake pack, the brake return springs are compressed by the mechanical apply system. This compression of the components in the mechanical apply system results in a linear force feed-back to the driver's foot.

However, when the hydraulic apply begins to provide brake pressure, it assumes the load from the mechanical system but does not provide a concomitant feed-back to the driver's pedal. Thereafter, the apply pressure is purely hydraulic until the hydraulic valve is fully stroked and the brake pressure is at its maximum. Once the maximum hydraulic application is achieved, operation of the mechanical aspect of the combined system returns. That is, rotation of the brake apply member brings the rollers into contact with the opposed ramps such that the application of additional torque on the apply shaft results in a proportionately increased mechanical force of the brake apply member.

The problem is that the tendency of the driver is to "push through" the initial point where the resistance to his foot is greatly reduced. This results in an unintended increase in the deceleration rate as the additional, unintentional stroking of the hydraulic apply system increases the apply pressure. The result can be unexpected, sudden braking.

Various solutions have been sought for this problem, such as, for example, applying the service brake solely by virtue of the hydraulic system and using a separate apply shaft to actuate the mechanical system solely as a parking and emergency brake that must be applied by a hand-actuated lever. One difficulty with this approach, of course, is that, in the event of hydraulic failure, the driver must react quickly to find and apply the emergency brake in order to bring the vehicle to a stop.

Another possible problem with this approach is that the hydraulic valve will not fill and stroke the brake piston at a sufficiently rapid rate for partial brake application. Furthermore, during a full apply, the valves of the hydraulic system are fully stroked, resulting in a rapid apply time for the brakes. However, during a partial apply, as in a request for a slow rate of deceleration, these valves are only partially stroked. This creates a flow restriction past one of the valves, thus increasing the delay time of initial brake pack closing and, therefore, may delay brake response to unacceptable limits.

It is, therefore, deemed desirable to provide a system which takes full advantage of the self-energization factor of the mechanical application system, but permits the application of an opposing hydraulic pressure that is regulated by an electronic system which senses the desired deceleration rate in response to the degree to which the brake pedal is depressed.

SUMMARY OF THE INVENTION

It is, therefore, a primary object of the present invention to provide an improved vehicular braking system that employs self-energization to enhance the braking action.

It is another object of the present invention to provide a vehicular braking system, as above, that employs an electronically-controlled hydraulic balancing force against the mechanical brake apply system in order to avoid nonlinear brake pedal resistance and excessive brake lag at partial apply.

It is a further object of the present invention to provide a vehicular braking system, as above, wherein the opposing hydraulic force is applied in response to the requested vehicle deceleration rate—as determined by brake pedal deflection—with the hydraulic force being generated through a controller that reacts to the requested deceleration rate.

It is still another object of the present invention to provide a vehicular braking system, as above, in which the level of self-energization may be significantly increased while maintaining stability in the system through the operation of a hydraulic system.

It is yet another object of the present invention to provide a vehicular braking system, as above, wherein the cam surfaces on the opposed apply and reaction ramps are inclined to an angular degree which provides maximum selfenergization of the system.

It is an even further object of the present invention to provide a vehicular braking system, as above, wherein an anti-lock braking system (ABS) is utilized to control the counteracting hydraulic force, the ABS being reactive to pedal travel in order to ascertain the desired deceleration rate and provide the necessary hydraulic force required to counteract the mechanical force and achieve a continuous force versus displacement curve at the pedal.

These and other objects of the invention, as well as the advantages thereof over existing and prior art forms, which will be apparent in view of the following detailed specification, are accomplished by means hereinafter described and claimed.

In general, a vehicular braking system embodying the present concept utilizes multi-plate brake packs in conjunction with a mechanical actuating system that comprises reaction ramps secured to ground and apply ramps presented from an annular apply cam member as well as from a brake apply annulus, the latter component being disposed adjacent the brake pack with rollers between the ramps as well as between the brake pack and the brake apply annulus. The annular apply cam is connected to the brake pedal by a suitable linkage. In that way actuation of the brake pedal transmits a brake apply force to the brake pack as the annular apply cam member rotates and the rollers react between the opposed ramps to apply an axial force against the brake pack by translation of the brake apply annulus.

The system also includes an ABS which is actuated in response to depression of the brake pedal. The ABS actuates one or more hydraulic pistons which act against the brake apply ring in a direction axially opposite the mechanical forces applied to the brake apply ring. The resulting braking force produces the required deceleration rate until the brake pedal is released.

The present invention is described in conjunction with one exemplary embodiment of a vehicular braking system which is deemed sufficient to effect a full disclosure of the subject invention. The exemplary braking system is described in detail without attempting to show all of the various forms and modifications in which the invention might be embodied; the invention being measured by the appended claims and not by the details of the specification.

BRIEF DESCRIPTION OF THE DRAWINGS

FIG. 7 is an enlarged, partially exploded perspective of the brake apply assembly depicted in FIGS. 5 and 6 removed from the housing, and with selected components of the brake apply assembly disposed in their juxtaposed, operative relationship;

FIG. 8A is an exploded perspective of that portion of FIG. 7 designated as "FIG.-8A" and depicting a portion of the brake apply assembly removed from the housing;

FIG. 8B is an exploded perspective of that portion of FIG. 7 designated as "FIG.-8B" and depicting another portion of the brake apply assembly removed from the housing;

DESCRIPTION OF AN EXEMPLARY EMBODIMENT

Figure 1:
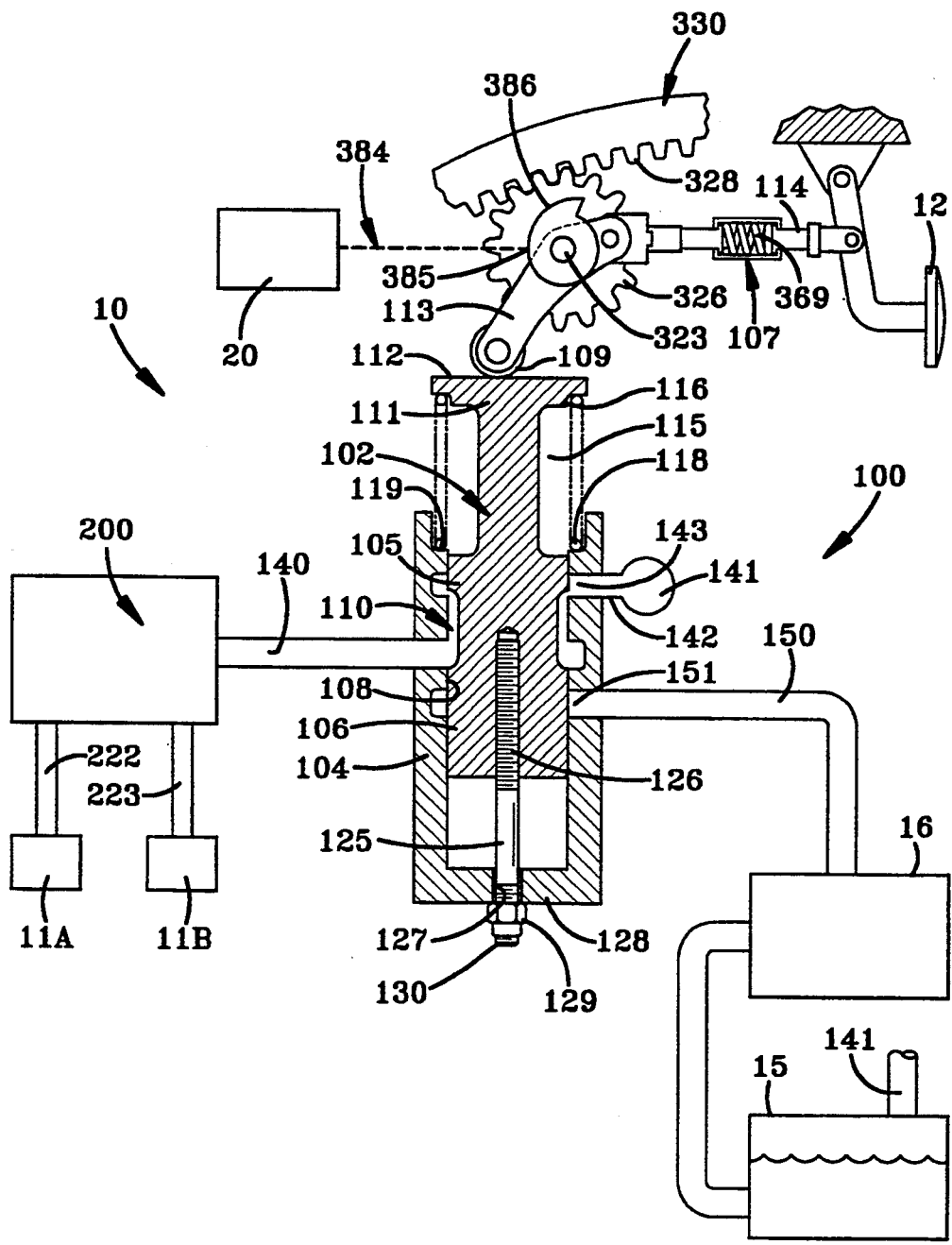
FIG. 1 is a schematic drawing representing the major components utilized in a self-energizing vehicular braking system embodying the concepts of the present invention, with particular emphasis on the brake coolant signal valve which ii depicted in longitudinal section to represent the disposition of the components therein in the unactuated state.

One representative form of a vehicular braking system embodying the concepts of the present invention is designated generally by the numeral 10 on the accompanying drawings. As depicted in FIG. 1, the representative braking system 10 may employ a brake coolant signal valve 100 that controls the flow of coolant to the brake packs 11 upon initial depression of the brake pedal 12. A description of the brake coolant signal valve 100 will be hereinafter described in detail.

The representative braking system 10 also employs a brake coolant valve 200. The brake coolant valve 200 controls, and directs, the flow of the coolant fluid to the brake packs 11. The brake coolant valve 200 will also be hereinafter more fully explained.

Finally, the representative braking system 10 also utilizes any well known, or conventional, anti-locking brake system 20 such as the ABS available from General Motors Corporation and identified generally herein by the numeral 20.

Figure 2:
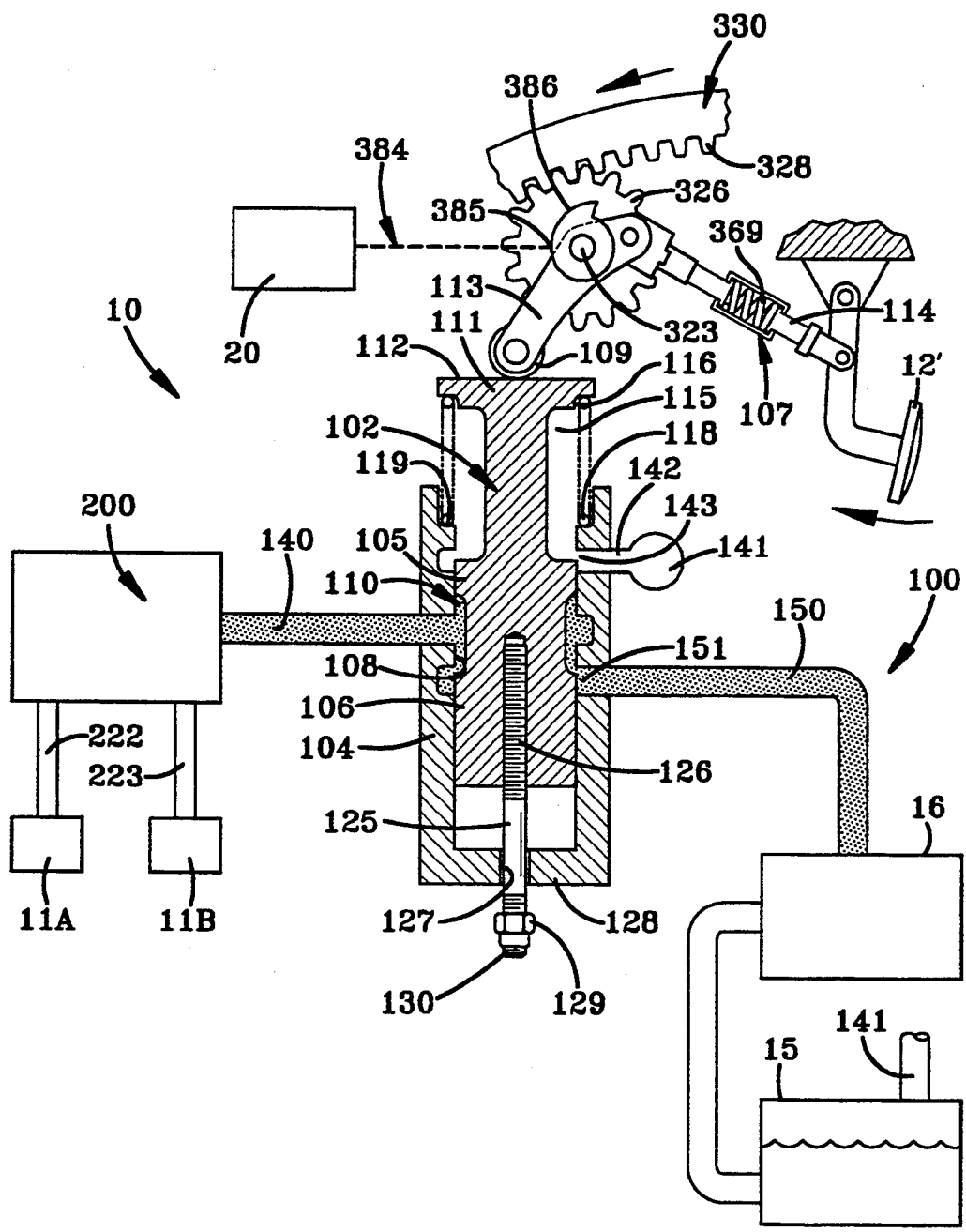
FIG. 2 is a view similar to FIG. 1 but depicting the components of the brake coolant signal valve disposed in response to depression of the brake pedal by the vehicle operator.

It should be noted that the hydraulic fluid employed to cool and lubricate the brakes may be stored in a reservoir 15, as best seen in FIGS. 1 and 2. A pump 16 is generally employed to supply hydraulic fluid from the reservoir 15 to the brake coolant signal valve 100 at the desired mainline pressure.

The several components employed in the overall vehicular braking system 10 will, for overall clarity, be described individually. It has been deemed appropriate to describe the operation of each such component in conjunction with the structural description thereof in order to preclude the necessity for an overly cumbersome operational description at the end of the specification.

Brake Coolant Signal Valve

Turning now to an explanation of the brake coolant signal valve 100, it must be understood that the brake coolant signal valve 100 provides a brake apply signal pressure to operate a brake coolant valve 200 which, in turn, controls the application of a coolant—normally cooled hydraulic fluid.

As depicted in FIG. 1 the brake coolant signal valve 100 employs a valve member 102 that is received within a housing 104 for axial translation. The spool member 102 has a pair of axially spaced, first and second cylindrical lands 105 and 106, respectively, of equal diameter which slidingly engage a cylindrical, interior wall portion 108 of the housing 104 to define a brake apply signal chamber 110 between the lands 105 and 106.

The spool member 102 has a head portion 111, the outwardly directed face 112 of which may be engaged by a low friction roller 109 presented from an actuating arm 113. The roller 109 applies a displacing force to the spool member 102 in response to the application of force to the brake pedal 12 by the operator. When the actuating arm 113 is mechanical, as depicted in the drawings, it may be mounted for rocking action in response to depression of a brake pedal 12 by the operator of the vehicle. The connection between the brake pedal 12 and the actuating arm 113 may be accomplished by link means, such as shown at 114, which acts through a force apply/feed-back device 107. The force apply/feed-back device 107 will be hereinafter described to a greater extent in conjunction with the brake apply ramp assembly 300, but for the present it is sufficient to understand that initial deflection of the brake pedal 12 effects a concomitant deflection of the actuating arm 113.

The actuating arm 113 may be mounted on an extension of the hereinafter more fully described apply shaft 323 depicted in end view in FIGS. 1 and 2 but best seen in FIGS. 6 and 7A and more fully described in conjunction with the mechanical apply system 300. The actuating arm 113 may, however, be connected to the foot pedal 12 by other suitable force transfer systems, not shown.

The head portion 111 of the spool member 102 may be annularly recessed, as at 115, to present an annular rim 116 that is engaged by a compression, return spring 118 which acts between the opposed, annular rim 116 and a shelf 119 presented from the housing 104. The return spring 118 applies a biasing resistance to translation of the spool member 102, and that resistance may be reflected against depression of the brake pedal 12 in order to provide a tactile feed-back to the operator. Moreover, the return spring 118 tends to maintain the spool member 102 in, or to return the first spool member 102 to, the unactuated state depicted in FIG. 1.

A translation limiting anchor rod 125 is anchored in the spool member 102, as by the threaded attachment 126, and the anchor rod 125 extends slidingly through an axial bore 127 in the base plate 128 to terminate in an adjusting nut 129 that may also be secured to the anchor rod 125, as by the threaded attachment 130. The adjusting nut 129 engages the base plate 128 to delineate the limit to which the spool member 102 can be translationally biased by the compression spring 118.

The unactuated disposition of the components in the brake coolant signal valve 100 is determined by the biasing action of the return spring 118 that operates in opposition to the anchor rod 125, as represented in FIG. 1. In the unactuated state of the brake coolant signal valve 100, the signal chamber 110 communicates with the brake coolant valve 200 by virtue of a brake apply signal feed conduit 140, and the brake signal chamber 110 also communicates with the hydraulic return system 141 through an exhaust conduit 142. Specifically, the exhaust conduit 142 opens to the signal chamber 110 through an exhaust port 143. In the unactuated state of the brake coolant signal valve 100, therefore, the brake apply signal chamber 110 provides a path by which the hydraulic fluid which actuates the brake coolant valve 200 can enter the hydraulic return system 141 to deactivate the brake coolant valve 200 and thereby terminate the flow of cooling fluid to the brake packs 11. The specific, structural details of the brake coolant valve 200 are also hereinafter more fully described.

As previously noted, the source of hydraulic fluid employed to actuate the brake coolant valve may be stored in a reservoir 15 that is fed by the hydraulic return system 141. A pump 16 is generally employed to supply hydraulic fluid from the reservoir 15 to the brake coolant signal valve 100 at the desired mainline pressure. As shown, the pressurized hydraulic fluid from the pump 16 is fed into the brake coolant signal valve 100 by supply conduit 150. In the unactuated state of the brake coolant signal valve 100, pressurized hydraulic fluid is not provided to the signal chamber 110. Instead, the second land 106 on the spool member 102 blocks the inlet port 151 by which the conduit 150 opens through the cylindrical, interior wall portion 108 of the housing 104 selectively to feed the signal chamber 110.

When the vehicle operator initially depresses the brake pedal 12 the roller 109 on the actuating arm 113 applies a force against the outwardly directed face 112 on the head portion 111 of the spool member 102. The force applied by the actuating arm 113 translates the spool member 102, as depicted in FIG. 2, when that force is sufficient to overcome the biasing action of the return spring 118. As the spool member 102 is thus translated, the first land 105 thereon blocks the exhaust port 143, thereby closing communication between the brake coolant signal chamber 110 and the hydraulic return system 141. That same translation of the first spool member 102 also translates the second land 106 away from the inlet port 151 to permit communication between the conduit 150 and the signal chamber 110. Mainline hydraulic pressure is thereupon transmitted through the signal chamber 110 and the signal feed conduit 140 to open the brake coolant valve 200 and allow cooled hydraulic fluid to bathe, and cool, the brake packs 11. The operation of the brake coolant valve 200 will now be described.

Brake Coolant Valve

To reiterate, the brake coolant valve 200 controls the flow of a coolant—normally the cooled hydraulic fluid available from the same source as the hydraulic fluid flowing to, or through, the brake coolant signal valve 100—to the engageable torque transfer device—i.e.: the brake packs 11—during their application. The brake coolant valve 200 is actuated by a brake apply signal pressure provided by the brake coolant signal valve 100, as previously described.

Figure 3:
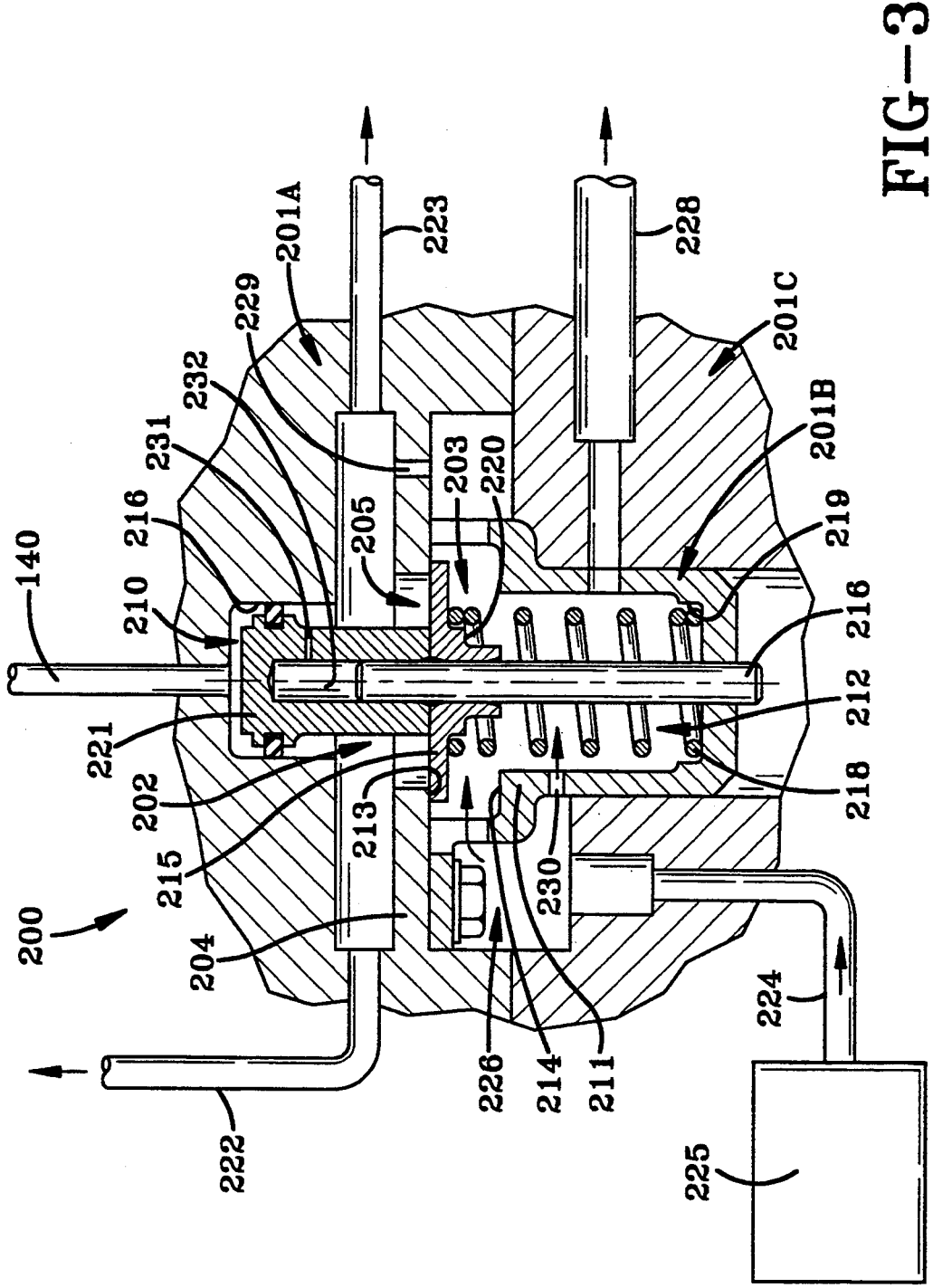
FIG. 3 is an enlarged portion of FIG. 1 depicting the components of the brake coolant valve represented in their normal disposition prior to depression of the throttle pedal.
Figure 4:
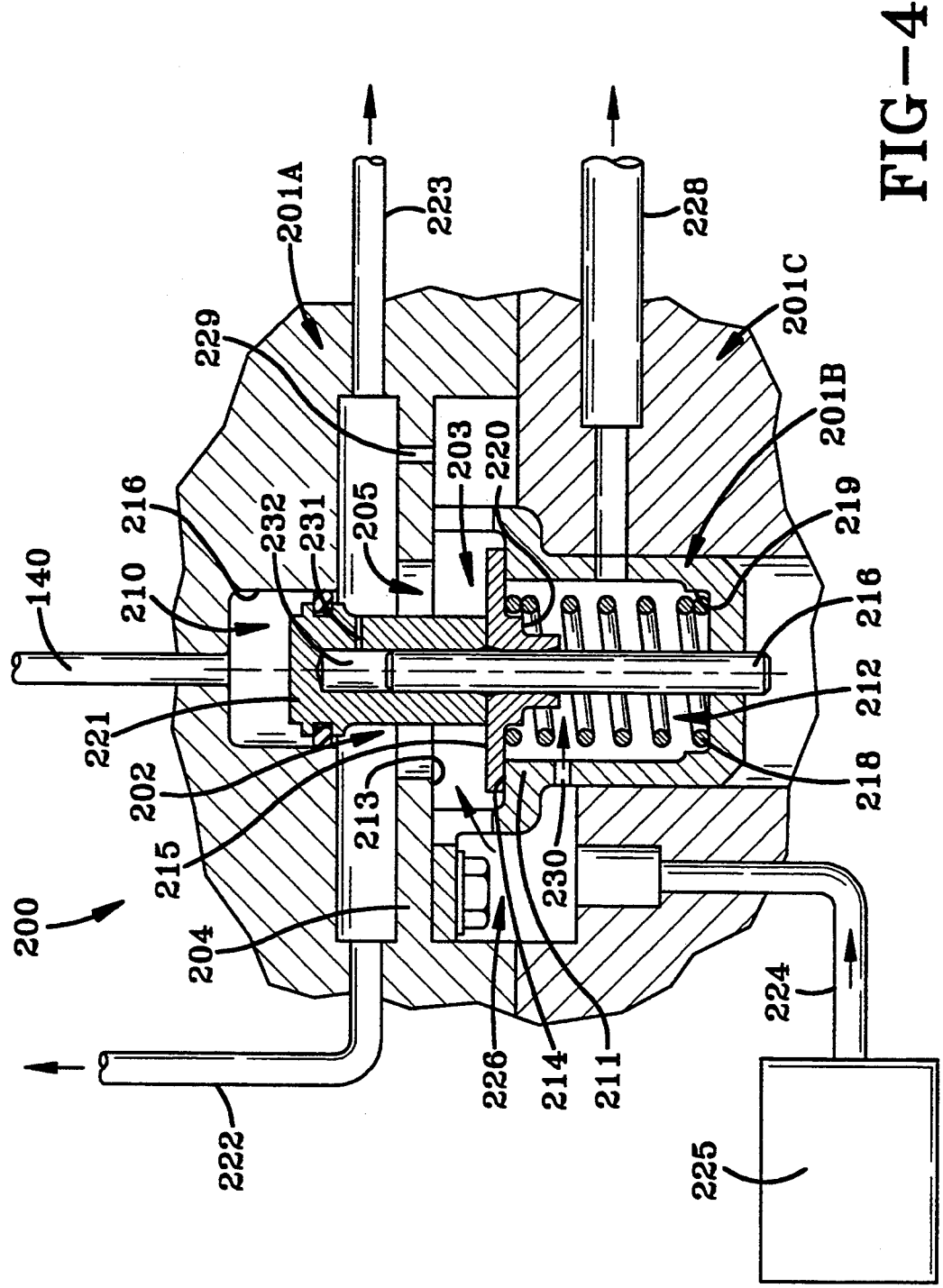
FIG. 4 is a view similar to FIG. 3, but depicting the components of the brake coolant valve disposed as they are in response to depression of the brake pedal.

The mechanism of the brake coolant valve 200—as depicted in FIGS. 3 and 4—may be contained within a multi-piece housing 201 that may be incorporated integrally with, or separate from, the housing 104 within which the brake coolant signal valve 100 is received. For example, as depicted, the housing 201 constitutes three sub-housings $201_A$, $201_B$ and $201_C$. As such, the sub-housing $201_A$ contains a first, or coolant delivery, chamber 202. A second, or lubricant delivery, chamber 203 is contained within sub-housing $201_B$. The lubricant delivery chamber 203 is separated from the coolant delivery chamber 202 by a transverse, medial wall 204 incorporated in sub-housing $201_A$. The transverse medial wall 204 is penetrated by a passage 205 through which communication between the first and second chambers 202 and 203 can be selectively effected. A piston chamber 210 also resides in sub-housing $201_A$ and extends axially outwardly from the coolant delivery chamber 202.

A shoulder 211 is presented from sub-housing $201_B$ in axially spaced relation from the medial wall 204 with the coolant delivery chamber 203 disposed between the medial wall 204 and the shoulder 211. A lubricant delivery sub-chamber 212, encased within sub-housing $201_B$ extends axially outwardly from the lubricant delivery chamber 203 past the shoulder 211. A first valve seat 213 is presented from the medial wall 204 in spaced opposition to a second valve seat 214 presented from the shoulder 211.

A valve element 215 is translatable between the first and second valve seats 213 and 214 along the axis of a pilot pin 216 that is fixedly secured to the sub-housing $201_B$. A compression spring 218 acts between the sub-housing $201_B$ and the valve element 215 to bias the valve element 215 into operative engagement with the first valve seat 213 which circumscribes the passage 205 that communicates between the first and second valve chambers 202 and 203, respectively, within the adjacent sub-housings $201_A$ and $201_B$ of the brake coolant valve 200. As shown, the compression spring 218 may circumscribe the pilot pin 216 with one end received within a cylindrical anchoring recess 219 in the subhousing $201_B$ and with the other end received over a centering boss 220 provided on the underside of the valve element 215. The compression spring 218 continuously biases the valve element 215 toward engagement with the first seat 213 in order to preclude flow between the second and the first valve chambers 203 and 202 through the passage 205.

A valve operating piston 221 is received within the piston chamber 210 that extends axially outwardly from the first, or coolant delivery, chamber 202 in the sub-housing $201_A$. The piston chamber 210 communicates with a signal feed conduit 140 that originates within the brake coolant signal chamber 110 of the brake coolant signal valve 100. The valve element 215 is operatively connected to the piston 221, as by a surface engagement therebetween, such that the valve element 215 translates in direct response to translation of the piston 221. As such, it may prove desirable for the piston 221 to be integral with the valve element 215.

The first chamber 202 communicates with coolant feed lines 222 and 223 that delivers the cooling fluid to the torque transfer device utilized by the hereinafter described brake packs 11. A supply conduit 224 from the cooler 225 communicates with an entry chamber 226 (formed at the juncture of sub-assemblies $201_A$ and $201_C$) to admit the cooled hydraulic fluid into the second chamber 203. When the brake coolant valve 200 is closed, as depicted in FIG. 3, the main volume of the cooled hydraulic fluid entering the second chamber 203 through the hydraulic fluid supply conduit 224 from the cooler 225 flows into the lubricant delivery sub-chamber 212 and is then discharged through the lubricant distribution conduit 228 which communicates with the sub-chamber 212. In addition, a small portion of the cooled hydraulic fluid entering the second chamber 203 is delivered to the first chamber 202 through a first, restricted orifice 229 in order to provide an uninterrupted supply of cooling fluid with which to bathe the brake packs 11, even when it is not being applied.

When the brake coolant signal valve 100 is operated by depression of the brake pedal 12, the brake demand effected by depression of the foot pedal 12 applies a signal pressure to the piston chamber 210 in the brake coolant valve 200 from the brake coolant signal chamber 110 in the brake coolant signal valve 100, as previously described. The signal pressure acts within the piston chamber 210 to translate the operating piston 221 and displace the valve element 215 away from the first valve seat 213 and into sealing engagement with the second valve seat 214, as shown in FIG. 4. This full displacement of the valve element 215 fully opens the passage 205 and thereby permits the cooled hydraulic fluid in the second chamber 203 of the brake coolant valve 200 to flow into the first chamber 202. The resulting unrestricted flow of the cooled hydraulic fluid from the second chamber 203 to the first chamber 202 allows virtually the full flow of the cooled hydraulic fluid through the supply conduit 224 from the cooler 225 to be made available to cool the brake packs 11 when they are being applied.

A second, restricted orifice 230 communicates between the entry chamber 226 and the lubricant delivery chamber 212 to assure that at least a small portion of the cooled hydraulic fluid will be provided for general lubrication, even when the brakes are applied. During application of the brakes, therefore, a continued small portion of the hydraulic fluid is permitted to pass from the entry chamber 226, through the second restricted orifice 230, into the lubrication delivery sub-chamber 212, and from there into conduit 228. This arrangement assures the continued flow of at least a minimal quantity of lubricating fluid to the remainder of the system, even during the application of maximum braking effort.

In order to ensure that the valve element 215 will be properly displaced in response to the application of the signal pressure within the piston chamber 210 it may be astute to provide a relief passage 231 which will allow any fluid that might inadvertently collect within the pilot bore 232 which receives the pilot pin 216 to exit outwardly through the relief passage 231 and not obstruct the operation of the piston 221 or the valve element 215. By selecting a suitable cross sectional area for the relief passage 231 that passage can admit fluid into the pilot bore 232 when the valve is in its unactuated state (FIG. 3), and modestly restrict the exiting flow of fluid from the pilot bore 232, thereby hydraulically dampening the translational opening movement of the valve element 215. By thus damping the translation of the valve element 215 it will not open the passage 205 too quickly nor will the valve element 215 translate in response to any transient spike in the signal pressure applied to chamber 210.

Brake Apply Ramp

A mechanical brake apply assembly 300—which is incorporated in the vehicular braking system 10—is depicted in FIGS. 5 through 9. The brake apply assembly 300 effects the application of brake apply force to the brake packs 11 in response to mechanically generated forces. The brake packs 11 are operatively associated with the output shafts 301 of a cross-transmission, or vehicle. The details of the transmission, being well known to the art, are not depicted in the drawings attached hereto. The brake assembly 300 is received within a brake housing 302 that is typically located linearly adjacent the transmission casing 303 so that rotation of the output shaft 301 can be transmitted to the brake apply assembly 300 received within the brake housing assembly 302. One may, if desired, combine the brake housing 302 with the transmission casing 303, but for simplification of the present explanation they will be deemed to be contiguous, but separate.

The shaft 301 is connected by a spline 307 to a carrier assembly 317 of a planetary gear set 327. The planet carrier assembly 317 has pinion gears 347 which mesh with a ring gear 357 and a sun gear. The sun gear is identified by the spline-teeth 306 formed on a sun gear shaft 304. The sun gear shaft 304 provides an input member for the planetary gear set 327. A sleeve shaft 329 is drivingly connected to the sun gear shaft 304 by teeth 305 and is connectible through teeth 337 to a conventional drive shaft from a transmission, not shown. The sleeve shaft 329 is movable axially to permit ease of connection between the planetary gear set 327 and the transmission in a well known manner. The spline-teeth 306 on the sun gear shaft 304 also operatively engage the splines 308 on a hub member 309. A radially outer rim 310 of the hub member 309 is provided with a plurality of axially extending splines 311 (FIG. 6) operatively to engage the brake pack 11. Actuation of the brake pack 11, as hereinafter explained, will provide a direct connection between the brake housing 302, and thereby the transmission casing 303, and the sun gear shaft 304. This will create a braking effect on the carrier assembly 317, and therefore shaft 301, which will provide slowing of the vehicle.

Figure 5:
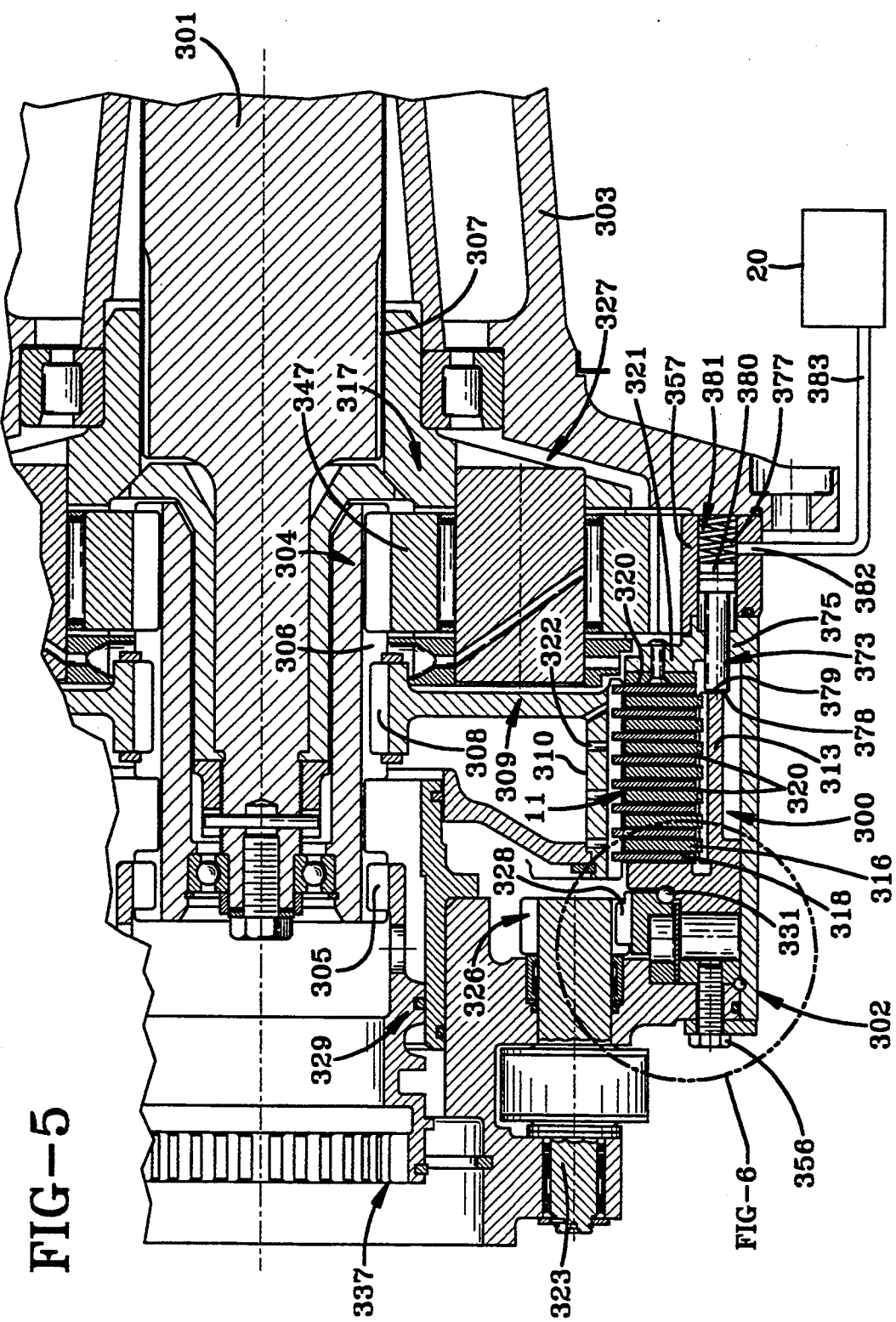
FIG. 5 is a schematic cross section taken axially through that portion of a transmission case which houses a brake assembly that acts upon the transmission output shaft in proximity to its connection with an axle assembly of a vehicle, the cross section depicting a representative brake apply assembly employing Opposed camming ramps to effect the mechanical actuation of the brake pack and an actuating cylinder to effect hydraulic actuation of the brake pack, the mechanical and hydraulic actuating systems being compatibly cooperative.
Figure 6:
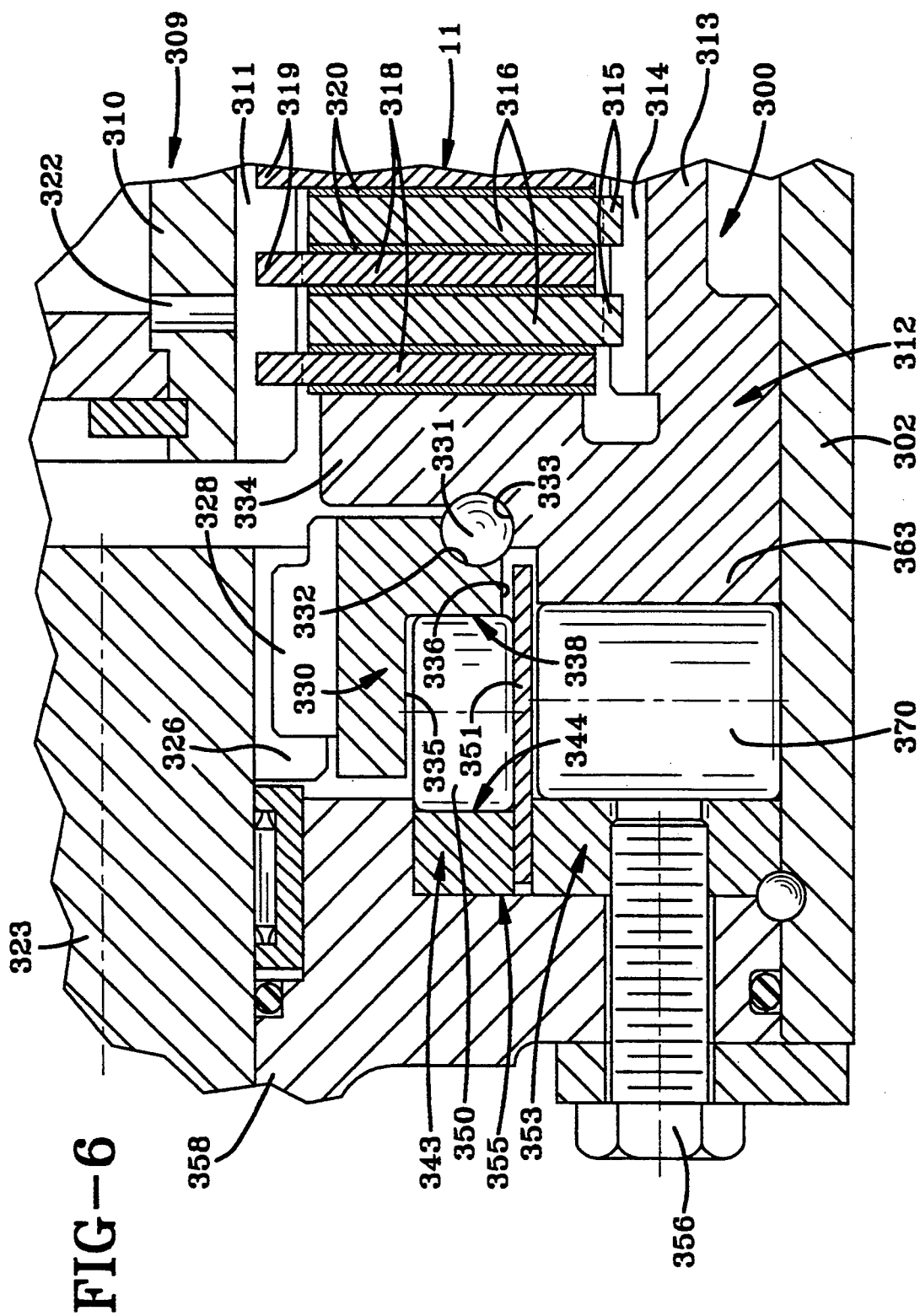
FIG. 6 is an enlarged area of that portion of the schematic cross section of FIG. 5 defined generally by the circle designated as "FIG.-6" therein.

With continued reference to FIG. 6, it will be observed that the brake pack 11 is operatively connected between the hub member 309 and a brake apply annulus 312. Specifically, the radially inner surface on the skirt portion 313 of the brake apply annulus 312 may incorporate splines, in the nature of axial slots, as at 314, to receive the mating splines, in the nature of tangs, 315 of the first, annular, reaction torque plates 316 and thereby assure that the first torque plates 316 are not relatively rotatable with respect to the brake apply annulus 312. To assure that the interaction between the brake apply annulus 312 and the splines 315 is sufficient to withstand the loading to which the splines 315 may be subjected, a plurality of axially oriented splines, or slots, 314 are employed at circumferentially spaced intervals about the radially inner surface on the skirt portion 313 of the brake apply annulus 312, and the first torque plates 316 are provided with a sufficient number of tang splines 315 to interact with those slot splines 314, as is well known to the art. For simplification of the exploded perspectives—FIGS. 7 and 8B—only two torque plates 316 are depicted. This same number are depicted in FIG. 6, but as should be appreciated, a plurality of such plates 316 may be stacked in operative relation with the hereinafter described second, torque plates 318, as is also well known to the art. As depicted in FIG. 5, seven, first—or reaction—torque plates 316 are interleaved with eight, second—or drive—torque plates 318.

The splines 311 on the radially outer rim 310 of the hub member 309 are also spaced at circumferential intervals to receive the several splines, in the nature of tangs, 319 which extend radially inwardly from each of the plurality of second, annular torque plates 318 and thereby assure that the second torque plates 318 will not rotate relative to the hub member 309, and thus the transmission output shaft 301, as is also well known to the art.

Annular friction disks 320 are preferably interposed between each of the successive first and second torque plates 316 and 318, respectively. To assure that the several friction disks 320 will not be displaced when they are not compressed between the successive first and second torque plates 316 and 318, a friction disk 320 is, as a general rule, secured to both sides of the alternate first or second torque plates 316 or 318. By thus securing the friction disks 320 to only one of the torque plates 316 or 318 the chance of having any friction disk 320 directly engage another friction disk 320 is obviated. It is, of course, also possible to apply one friction disk 320 to only one side of each torque plate 316 and 318. In this arrangement care must be exercised to assure that only one friction disk is sandwiched between successive torque plates 316 and 318 in order to preclude direct engagement between friction disks 320.

An annular backing plate 321 (FIG. 5) is also preferably presented from the brake housing assembly 302 to provide a fixed member against which the brake pack 11 may be compressed. As shown, one of the friction disks 320 may also be secured to the backing plate 321. The specific interaction and operation of the structural members in the present brake apply assembly 300 by which that compression is effected will be hereinafter more fully explained.

As previously explained, the brake coolant signal valve 100 provides a signal pressure to operate a brake coolant valve 200 which, as previously described, controls the application of a coolant to the torque transfer devices employed in each brake pack 11. In the embodiment depicted, the torque plates 316 and 318 as well as the friction disks 320 constitute a brake pack 11. A plurality of ports 322 extend radially through the rim 310 of the hub member 309 to dispense the cooling fluid radially outwardly over the brake pack 11.

Focusing more specifically on the brake apply assembly 300, which includes the brake apply annulus 312, an apply shaft 323 is rotated in response to the application of pressure applied by the operator of the brake pedal 12 of the vehicle. See FIG. 1 taken in conjunction with FIGS. 6 and 7. A spur gear 326 is provided on the inboard end of the apply shaft 323 meshingly to engage the teeth 328 presented on the radially inner surface of an annular apply cam member 330. The axial orientation of the teeth on the spur gear 326, as well as the axial orientation of the teeth 328 on the annular apply cam member 330 permit relative axial movement therebetween, even while the teeth remain in meshing engagement. The ability of the annular apply cam member 330 to be readily displaced axially with respect to the apply shaft 323 while the two members remain in meshing engagement is quite important to the operation of the brake apply assembly 300 utilizing a toothed input mechanism, as will hereinafter become more fully apparent.

A plurality of ball bearings 331 are interposed between the race 332 (FIG. 6) presented from the annular apply cam member 330 and the opposed race 333 provided on the radially inwardly directed flange 334 of the brake apply annulus 312. As will be hereinafter more fully explained, the ball bearings 331 will effect axial force transfer between the annular apply cam member 330 and the brake apply annulus 312, even though those two components are relatively rotatable. As will be hereinafter described, axial translation of the annular apply cam member 330, for any reason, will, through the application of axial force by the ball bearings 331, tend to effect axial translation of the brake apply annulus 312. In this regard one should also refer to FIG. 9.

Figure 9:
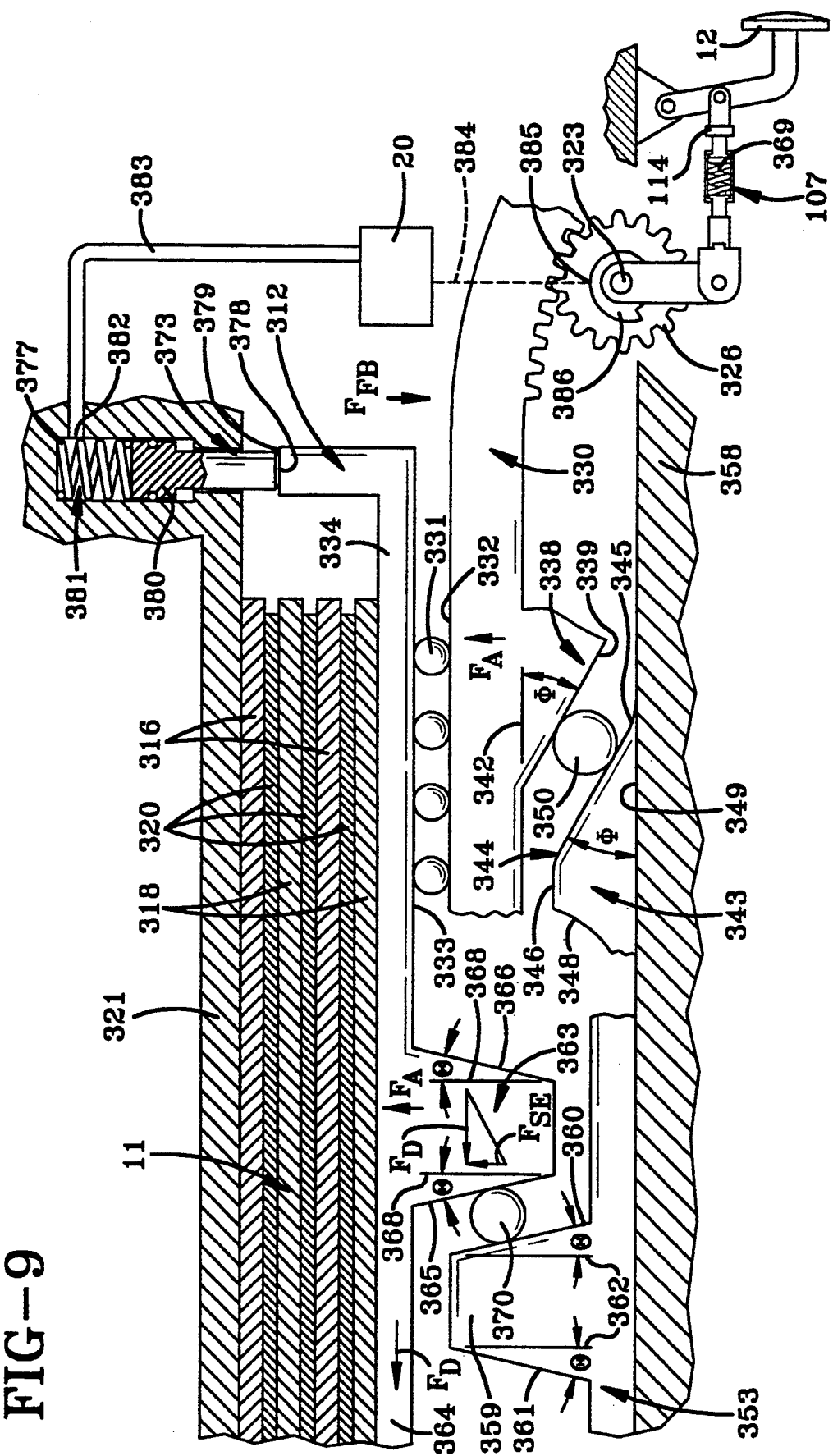
FIG. 9 is a schematic, elevational representation of a portion of the brake assembly to assist in explaining the self-energizing features of the brake assembly as well as the mathematical expressions which delineate that self-energization; and, FIG. 10 is a curve depicting the vehicle deceleration rate plotted against the brake apply shaft torque and pedal travel.

As best seen in FIGS. 7 and 8A, the radially outwardly directed surface of the apply cam member 330 is defined by radially offset, cylindrical first and second surfaces 335 and 336, respectively. A camming surface, indicated generally by the numeral 338, extends radially between the first offset surface 335 and the second offset surface 336. The camming surface 338 is comprised of a plurality of axially inclined apply ramps 339—fifteen in the embodiment depicted—disposed between null peaks 340 and return surfaces 341 such that each apply ramp 339 is inclined at an angle $\Phi$ with respect to a circumferential frame of reference 342, as represented in FIG. 9.

An annular reaction cam member 343 is disposed in axial opposition to the apply cam member 330. The reaction cam member 343 presents an axially disposed cam surface, identified generally by the numeral 344. The reaction cam surface 344 also comprises a plurality of axially inclined, reaction apply ramps 345—fifteen in the embodiment depicted—disposed between null peaks 346 and return surfaces 348 such that each reaction apply ramp 345 is also inclined at an angle $\Phi$ with respect to a circumferential frame of reference 349 which is disposed in parallel relation to the circumferential frame of reference 342 on the annular apply cam member 330, as also represented in FIG. 9. One apply roller 350 is disposed between each of the opposed apply ramps 339 and 345 on the apply cam member 330 and the reaction cam member 343, respectively, for a purpose more fully hereinafter described.

A containing skirt 351 extends circumferentially about the reaction cam member 343. The reaction cam member 343, with the containing skirt 351 positioned circumferentially thereabout, is received within the central opening 352 through a response ring 353. A plurality of pins 354 extend radially through the response ring 353, the containing skirt 351 and into the reaction cam member 343 in order to secure those members into a single reaction assembly 355. A plurality of fastening means in the nature of machine bolts 356 (FIGS. 5 and 6) extend through the end wall 358 of the brake housing 302 to be anchored in the response ring 353, thereby securing the reaction assembly 355 to the brake housing 302.

The response ring 353 presents a plurality of circumferentially spaced, axially outwardly extending lobes 359. As depicted, sixteen lobes 359 would represent a typical embodiment. The opposed sides of each successive lobe 359 presents preferably planar self-energizing ramps 360 and 361 that are each inclined at an angle $\Theta$ with respect to an axial frame of reference 362, as represented in FIG. 9. An equal number of virtually identical lobes 363 extend axially outwardly at circumferentially spaced locations about the outer rim 364 of the brake apply annulus 312. The opposed sides of each successive lobe 363 also presents preferably planar self-energizing ramps 365 and 366 that are also inclined at an angle $\Theta$ with respect to an axial frame of reference 368 thereon, as represented in FIG. 9, which is substantially parallel with the axial frame of reference 362 on the response ring 353. There are preferably the same number of lobes 363 on the brake apply annulus 312 as the number of lobes 359 on the response ring 353, although the lobes 359 on the response ring 353 are circumferentially displaced with respect to the lobes 363 on the brake apply annulus 312. This circumferential displacement positions the self-energizing ramp 360 on each lobe 359 in opposition to the self-energizing ramp 365 on lobe 363. Similarly, the self-energizing ramp 361 on lobe 359 is thereby disposed in opposition to the self-energizing ramp 366 on lobe 363. A roller 370 is disposed between each pair of opposed self-energizing ramps 359 and 365 as well as each pair of opposed self-energizing ramps 361 and 366 on the successive lobes 359 and 363.

A plurality of displacement rods 373 are slidably received within a corresponding plurality of bores 374 circumferentially spaced about a support flange 375 that extends radially inwardly from the brake housing 302. The bores 374 may, as shown, alternate with mounting bores 376 which also penetrate the support flange 375. The previously described annular backing plate 321 may also be carried on the support flange 375.

The distal end 378 of each displacement rod 373 extends outwardly from the support flange 375 to engage the end face 379 on the skirt portion 313 of the brake apply annulus 312. The opposite, or proximal, end 380 of each displacement rod 373 is in the configuration of piston that is received within a feed-back chamber 381. The feed-back chamber 381 contains means by which to provide a biasing protraction of the displacement rod 373 against the end face 379 on the skirt portion 313 of the brake apply annulus 312. For an installation embodying the concept of the present invention the biasing means comprises the combined effort of a relatively low-force compression spring 377 and a preferably hydraulic feed-back signal pressure provided from the anti-lock brake system 20, the pressure of which will control the force with which the displacement rods 373 act against axial translation of the brake apply annulus 312. The spring 377 provides only a nominal biasing action. In fact, it need only be sufficient to release the engagement of the torque plates 316 and 318 in brake pack 11 when the brake apply cam member 330 releases pressure against the brake apply annulus 312. In addition, the compression spring 377 assures that the torque plates 116 and 118 in the brake packs 11 will not inadvertently compress without actuation of the mechanical apply system 300. The signal feed-back pressure may be admitted to the chamber 381 through a port 382. Specifically, feed-back signal pressure may be supplied to the port 382 by a conduit 383 which communicates with a conventional anti-locking brake system such as the well known ABS schematically represented at 20 available from General Motors Corporation. It should also be appreciated that the anti-lock braking system 20 incorporates a check valve to preclude rapid exhausting of the pressurized fluid within the chamber 381 when the brake pack is disengaged.

Operation of the brake apply assembly 300 is initiated when the vehicle operator applies pressure to the brake pedal 12, which effects rotation of the apply shaft 323, either directly or by virtue of a force transfer means, not shown. Rotation of the shaft 323, and the spur gear 326 secured thereto, rotates the annular apply cam member 330 and forces the apply ramps 339 to drive the apply rollers 350 against the reaction apply ramps 345 on the reaction cam member 343. Because the reaction cam member 343 is fixedly secured to the brake housing 302, the interaction between the apply ramps 339, the apply rollers 350 and the reaction apply ramps 345 translates the annular apply cam member 330 away from the reaction cam member 343 to drive the ball bearings 331 against radially inwardly directed flange 334 on the brake apply annulus 312, thus also axially translating the brake apply annulus 312 to compress the associated brake pack 11 between the flange 334 and the backing plate 321.

Figure 10:
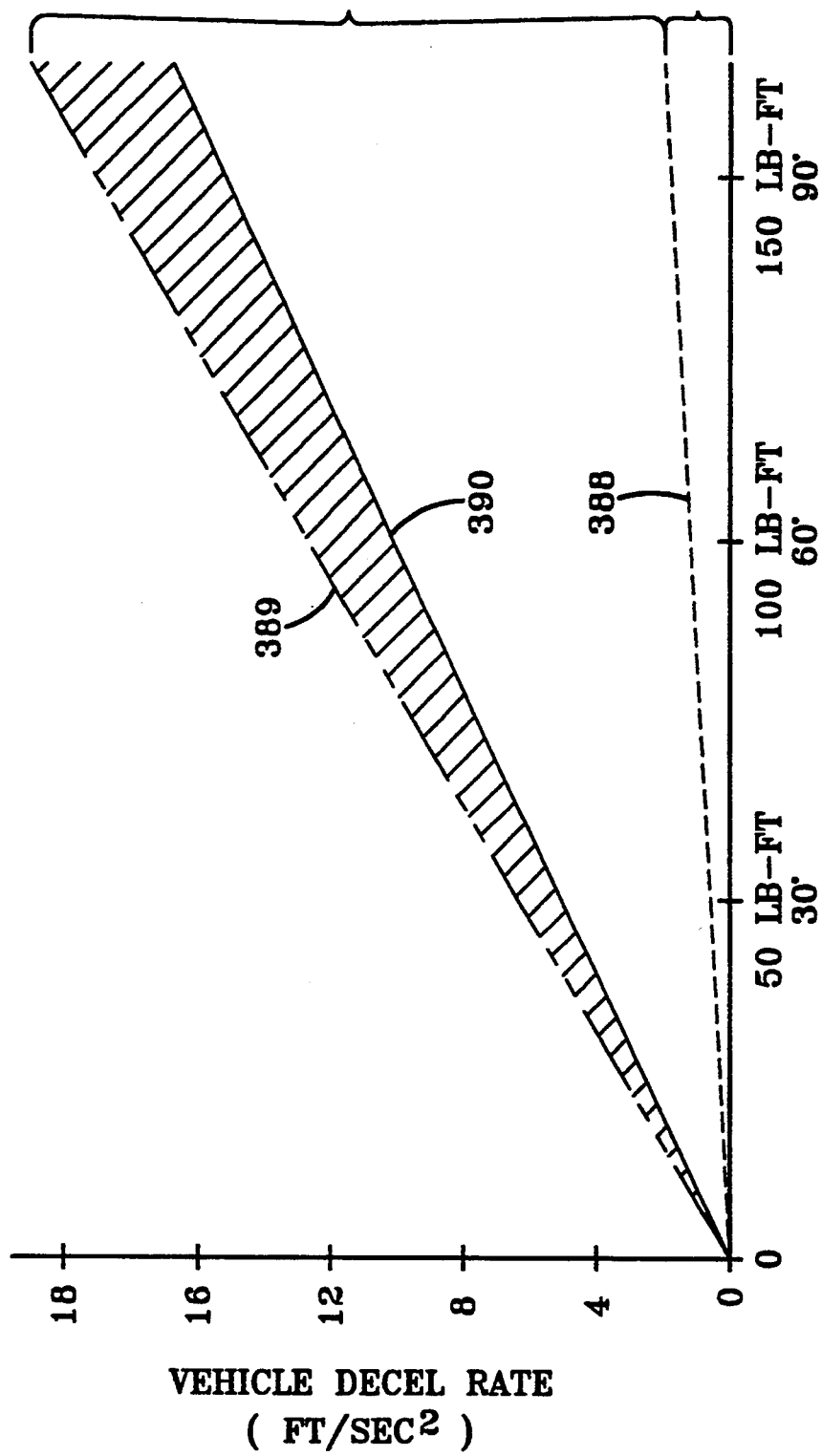

Initial stroking of the brake pedal 12 causes the brake packs 11 to close—i.e.: to take up any initial clearance between the torque plates 316 and 318—before any braking action can occur. As soon as the initial closing of the brake packs 11 has been effected, increased pedal force increases the level of braking. However, after the brake packs 11 are compressed to a certain degree, a further increase in the actuating pressure applied to the brake pedal 12 does not effect a concomitant deflection of the brake pedal 12 or effect an increase in the braking action. Inasmuch as the anti-lock brake system 20 requires a progressive movement of the brake pedal 12 to indicate a progressive increase in the requested rate of deceleration, the force apply/feed-back device 107 is used to accomplish that purpose. That is, the force apply/feed-back device 107 generates increasing force on the apply shaft 323 with an increase in the force applied to the brake pedal 12, even though neither the brake pedal 12 nor the apply shaft 323 move to any measurable extent. Thus, a spring 369 can, as depicted in FIGS. 1, 2 and 9, be employed within the force apply/feed-back device 107 to permit deflection of the brake pedal 12, and an increased force to the apply shaft 323, in response to the application of an increased force to the brake pedal 12, even though the brake packs 11 are closed, which would otherwise preclude further deflection of the brake pedal 12. Because the shaft 323 does not rotate after the brake packs 11 are closed, the designation "Pedal Travel after Pack Closure" has been employed on FIG. 10.

As the braking action between the interleaved torque plates 316 and 318 begins to take effect, the torque applied to those torque plates 318 rotating with the transmission output shaft 301 by virtue of the vehicular momentum is reflected back to the brake apply annulus 312. The torque is reflected through the interaction of the splines 315 on the first torque plates 316 with the splines 314 on the skirt portion 313 of the brake apply annulus 312. The resulting torque reaction is not, however, applied to the annular apply cam member 330 inasmuch as the ball bearings 331 isolate the annular apply cam member 330 from rotation of the brake apply annulus 312. To the contrary, the torque feed back to the brake apply annulus 312 does react against those rollers 370 located between the ramps 365 or 366 on the lobes 363 of the brake apply annulus 312 which are, by the reflected torque, rotated toward the opposed ramps 360 or 361 on the lobes 359 presented from the response ring 353. The resulting interaction of the ramps on lobes 359, the rollers 370 and the reaction ramps on lobes 363 effects an additional force on the annular apply cam member 330 away from the reaction cam member 343. This force also serves to drive the ball bearings 331 against the radially inwardly directed flange 334 on the brake apply annulus 312, thus effecting additional axial translation of the brake apply annulus 312 to compress the associated brake pack 11 even further. The brake application resulting from the feed back torque is designated as a self-energizing braking application, and its effect is additive to the brake apply force initially generated by rotation of the annular apply cam member 330.

With continued reference to FIG. 9, an in-depth understanding as to the operation of the mechanical brake apply assembly 300 can be achieved by understanding certain mathematical relationships generated by that assembly. The following mathematical terms are employed to express the mathematical relationships:

$F_A$ = The translation force applied by the brake apply annulus 312 in response to the interaction of the annular apply cam member 330 to the brake apply annulus 312 through the apply rollers 350;

$F_{SE}$ = The self energizing force applied to the brake apply annulus 312 in response to the interaction of the lobes 359 on the response ring 353 with the lobes 363 on the brake apply annulus 312 through the rollers 370;

$F_{FB}$ = Return spring force in springs 382;

$F_C$ = The total clamping force applied to the brake pack 11, which can be mathematical expressed as:

$$F_C = F_A + F_{SE} = F_{FB} \qquad (1)$$

In order to calculate the total amount of axial clamping force $F_C$ required to generate a braking torque "T", one needs the following additional mathematical terms:

$\mu$ = The coefficient of friction between the torque plates 316 and 318 and the interleaved friction disks 320;

$R_{FP}$ = The mean radius of the friction disks 320 measured in inches; and,

N = The number of friction disks 320.

The axial clamping force $F_c$ can then be calculated by the mathematical $$F_C = \frac{12T}{(\mu)(R_{FP})(N)} \qquad (2)$$

In order to calculate the self-energizing force $F_{SE}$ generated by that torque, one needs the following additional mathematical terms:

$R_{SE}$ = The radius (measured in inches) to the center of the self-energizing rollers 370; and, $\Theta$ = The angle of inclination of the self-energizing ramps 360 and 365 in one direction and 361 and 366 in the other direction.

The self-energizing force $F_{SE}$ can then be calculated by the following mathematical expression:

$$F_{SE} = \frac{12T}{(R_{SE})(\cot\theta)} \quad (3)$$

Finally, one must determine the angle $\Theta$ at which the system will not release—i.e.: the locking angle. The locking angle is the self-energizing ramp angle of inclination $\Theta$ that results in a self energizing force equal to the total force required to sustain the braking torque. In order for the system to release, the braking force must release when the apply force is removed. Otherwise, the brakes would lock every time the brakes were applied and would not release until the vehicle would be brought to a complete stop. Similarly, if the brakes were applied when the vehicle was on a grade, the brakes could not be released without moving the vehicle up the grade. As such, the locking angle $\Theta$ is achieved whenever:

$$F_{SE} = F_C \quad (4)$$

Expanding the foregoing mathematical expression, it will be observed that:

$$\frac{12T}{(R_{SE})(\cot\theta)} = \frac{12T}{(\mu)(R_{FP})(N)} \quad (5)$$

Simplifying, $$\cot\theta = N(\mu)\left(\frac{R_P}{R_{SE}}\right) \quad (6)$$

The percentage of self-energization of a system is defined as that percentage of the total apply force that is provided by the self-energization feature. Typically, one would employ something in the range of about thirty percent (30%) self-energization. That is seventy percent (70%) of the clamping force would be derived from the pressure applied to the brake pedal 12 and thirty percent (30%) of the clamping force would be self generated from the system itself.

The higher the ratio of the self-energization braking force with respect to the mechanical apply force applied by the operator through the input mechanism (such as the brake pedal 12), the more difficult the system is to control. That is, a large change in the total clamping force resulting from a small change in the mechanical apply force normally introduces a degree of instability. For that reason, the percentage of self-energization has heretofore been kept well below fifty percent (50%), with a resulting apply force advantage of below 2:1. Such a ratio generates sufficient total clamping force, but it requires that a reasonable comparable pedal force be applied by the vehicle operator.

The present system is designed to take maximum advantage of the self-energization feature. This result is accomplished by opposing the self-energizing force with a smaller, controlling force applied by the piston-like end 380 of each displacement rod 373. The present system is sufficiently sophisticated that each brake pedal position may represent a requested vehicle deceleration rate. As such, the pedal force required to attain that pedal position results in a combined apply and self-energization force in excess of that required to attain the required deceleration rate. The opposing hydraulic force may be regulated by an electronic, anti-locking, brake system 20, of the type previously identified herein, to generate the pressure required to reduce the net total force and thereby attain the requested deceleration rate.

The application of the releasing force, as by the anti-locking brake system, permits the percentage of self-energization to be dramatically increased. In fact, the releasing force can be designed to overcome one hundred percent (100%) of the self-energization force during normal operating conditions, but that percentage is not deemed to be acceptable in order to provide a parking brake and an emergency brake. However, a ninety percent (90%) self-energization system may be designed which meets both the parking and emergency brake criteria. At such values the pedal effort required to stop the vehicle under all conditions is greatly reduced.

In a representative embodiment wherein the locking angle $\Theta$ is calculated to be 27.5 degrees, the actual angle selected would be on the order of about 25 degrees—the difference between the calculated and the selected angular disposition of the self-energizing ramps allows an adequate margin for manufacturing tolerances.

The apply system would be designed to impose an equal force to the annular apply cam member 330 associated with each output member 301, that force being proportional to the pedal force and the linear stroke of the pedal 12. The displacement stroke of the pedal 12 would preferably interact with a force transducer, potentiometer, or other similar device, contained within the anti-lock brake system 20. The brake pedal 12 may be connected to the anti-lock brake system 20 through a link, or other force transfer mechanism, 384 which provides a follower 385 to engage an actuating cam 386 that is operatively rotated in conjunction with the shaft 323 in response to depression of the brake pedal 12. The configuration of the actuating cam 386 may be such that the anti-lock brake system 20 is not actuated until after the brake coolant vane 200 has been actuated and at an appropriate time relative to the operation of the mechanical brake apply mechanism 300. As shown in FIG. 2, the cam 386 is concentric relative to the axis of the shaft 323 until the brake pedal 12 has been depressed to position 12', and thereafter the cam extends helically outwardly to operate the link 384 which controls an interactive mechanical-hydraulic circuit in accordance with the circuitry in the anti-locking brake system 20 to adjust the total force applied to the brake packs 11 in order to attain the requested deceleration rate. The pressure applied to the piston-like end 380 of the displacement rods 373 acts against the excessive mechanical force applied by the self-energization system to continually update the actual deceleration rate in comparison to the requested rate—as determined by pedal position—in order to reduce, or increase, the pressure within chamber 381 in such a way as to attain the requested deceleration rate.

The hydraulic feed back from the anti-locking brake system does not relieve the apply system 300 of any of its load inasmuch as the feed back is applied to the isolated brake apply annulus 312 and not to the annular apply cam member 330. Hence, the feed back pressure from the anti-locking brake system relieves a portion of the self energizing force at the rollers 370 but does not measurably affect the position of the brake apply annulus 312. This results in a continuous force versus displacement curve at the pedal, as represented by curve 388 in FIG. 10. Curve 388 also reflects how the present system eliminates the heretofore experienced tendency of the driver to "push through" the pedal position where the resistance to his foot is greatly reduced—which typically occurs when a hydraulic brake apply is actuated, but which can also result from the self-energization of a mechanical brake apply. Push through results in an unintended increase in the deceleration rate as the additional, unintentional stroking of the brake apply system increases the apply pressure. The result can be unexpected, sudden braking. With continued reference to FIG. 10, the phantom curve 389 represents the total force applied to the mechanical apply system 300. That is, curve 389 represents the force applied by the operator plus one hundred percent (100%) self-energization. This it represents the available braking force that would have been applied in the absence of the anti-lock brake system feed-back. Curve 390, on the other hand, represents the total force available less the reduction to that force resulting from the feed-back applied by the anti-lock brake system 20.

It must be appreciated that the response of the anti-locking brake system is initiated by the pedal position and as a result, the response is as quick at partial brake application as it is at full brake application. Moreover, if the hydraulic system were to fail, the mechanical system would be unopposed in order to bring the vehicle to a stop—although at perhaps a somewhat greater deceleration rate than requested. Finally, holding a vehicle on a grade with the engine off would take advantage of the greatly enhanced self-energization feature of a brake apply assembly embodying the concepts of the present invention.

As should now be apparent, the present invention not only teaches that a vehicular braking system embodying the concepts of the present invention not only utilizes self-energization to its maximum potential but also accomplishes the other objects of the invention.

I claim:

1. A brake apply control system for a vehicle having a rotatable output member subjected to deceleration during braking, said control system comprising:

a mechanical input subject to operator input force to initiate brake apply and deceleration of the output member;

self-energizing means responsive to said mechanical input for increasing brake apply and deceleration of the output member;

electronically controlled hydraulic means for applying a force to counteract said self-energizing means to maintain the deceleration of the output member at a value predetermined by said manual input, said means for applying having pedal means to deflect in response to operator input force and means to sense the deflection of said pedal means;

a force apply/feed-back device interposed between said pedal means and said mechanical input to permit deflection of said pedal means in proportion to the magnitude of operator input force even when said mechanical input does not physically move; and, said force apply/feed-back device having a spring means to pass compressive forces up to a predetermined magnitude and provide a reaction force to actuate said hydraulic means.

2. A brake apply control system for a vehicle having a rotatable output member subjected to deceleration during braking, said control system comprising:

a brake pack operatively associated with said rotatable output member;

axially translatable brake apply means selectively to compress said brake pack;

an apply cam member selectively to translate said brake apply means;

apply ramps presented from said apply cam member;

reaction ramps presented from ground in opposition to said apply ramps;

roller means interposed between said opposed ramps;

operator deflected pedal means;

force transfer means operatively rotating said apply cam member in response to the degree to which said pedal means is deflected and thereby axially translating said brake apply means to operate said brake pack, said force transfer means having a force apply/feed-back device to permit deflection of said pedal means in proportion to the magnitude of operator input force even when said brake apply means does not physically translate;

said force apply/feed-back device having a spring means to pass compressive forces up to a predetermined magnitude and provide a reaction force to actuate said anti-lock system; and, electronically controlled hydraulic means to oppose brake pack actuating translation of said brake apply member in response to the degree of pedal deflection, said means for applying an opposing force having a hydraulic anti-lock braking system and electronic control means to actuate said anti-lock system in response to deflection of said pedal means.

* * * * *